US007076051B2

(12) United States Patent
Brown et al.

(10) Patent No.: US 7,076,051 B2
(45) Date of Patent: Jul. 11, 2006

(54) PROMOTING CALLER VOICE BROWSING IN A HOLD QUEUE

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 10/015,264

(22) Filed: Dec. 12, 2001

(65) Prior Publication Data
US 2003/0108184 A1 Jun. 12, 2003

(51) Int. Cl.
*H04M 3/00* (2006.01)
*H04M 5/00* (2006.01)

(52) U.S. Cl. .............................. 379/265.09; 379/266.01

(58) Field of Classification Search ........... 379/265.02, 379/265.13, 88.01, 265.09, 220.01, 265.01, 379/88.17, 88.18, 201.01, 266.01; 709/219, 709/228
See application file for complete search history.

(56) References Cited

U.S. PATENT DOCUMENTS

| 5,164,983 | A |   | 11/1992 | Brown et al. ........... 379/265.03 |
|---|---|---|---|---|
| 5,499,288 | A |   | 3/1996 | Hunt et al. |
| 5,590,188 | A |   | 12/1996 | Crockett .................... 379/225 |
| 5,646,988 | A |   | 7/1997 | Hikawa ................. 379/266.01 |
| 5,673,404 | A |   | 9/1997 | Cousins et al. |
| 5,790,637 | A |   | 8/1998 | Johnson et al. |
| 5,806,045 | A |   | 9/1998 | Biorge et al. ................. 705/14 |
| 5,864,872 | A |   | 1/1999 | Lee et al. ................... 711/115 |
| 5,915,001 | A |   | 6/1999 | Uppaluru |
| 5,933,828 | A | * | 8/1999 | Eitel et al. ..................... 707/10 |
| 5,937,044 | A |   | 8/1999 | Kim |
| 5,940,476 | A |   | 8/1999 | Morganstein et al. |
| 5,946,386 | A |   | 8/1999 | Rogers et al. |
| 5,946,388 | A |   | 8/1999 | Walker et al. |
| 5,946,654 | A |   | 8/1999 | Newman et al. |
| 5,948,061 | A | * | 9/1999 | Merriman et al. .......... 709/219 |
| 5,978,467 | A | * | 11/1999 | Walker et al. ......... 379/266.01 |
| 6,018,718 | A | * | 1/2000 | Walker et al. ................. 705/14 |
| 6,038,305 | A |   | 3/2000 | McAllister et al. |
| 6,046,762 | A |   | 4/2000 | Sonesh et al. ........... 348/14.11 |
| 6,058,364 | A |   | 5/2000 | Goldberg et al. |
| 6,064,730 | A |   | 5/2000 | Ginsberg ............... 379/265.09 |
| 6,087,574 | A | * | 7/2000 | Kitashima et al. ........ 84/423 R |

(Continued)

FOREIGN PATENT DOCUMENTS

EP          0585004 A2      3/1994

(Continued)

*Primary Examiner*—Benny Quoc Tieu
(74) *Attorney, Agent, or Firm*—Mark S. Walker; Amy J. Pattillo

(57) ABSTRACT

A method, system, and program for promoting caller voice browsing while a caller is waiting in a hold queue are provided. At least one web page is selected for voice browsing by a particular caller waiting in a hold queue. The particular caller may be offered an incentive to voice browse the at least one web page, such that an on hold system housing the hold queue may promote voice browsing of specific web pages. Incentives may be in the form of points that are redeemable by the caller, for example, for adjustments in position within the call queue. In addition, the identity of the caller is preferably authenticated and a caller profile accessed according to the authenticated caller identity. Voice browsing web page selections may be tailored for the caller according to the caller profile.

29 Claims, 9 Drawing Sheets

U.S. PATENT DOCUMENTS

| | | | |
|---|---|---|---|
| 6,088,435 A | 7/2000 | Barber et al. | 379/205.01 |
| 6,101,242 A | 8/2000 | McAllister et al. | |
| 6,125,178 A | 9/2000 | Walker et al. | 379/211.01 |
| 6,157,655 A | 12/2000 | Shtivelman | 370/412 |
| 6,178,230 B1 | 1/2001 | Borland | |
| 6,178,240 B1 * | 1/2001 | Walker et al. | 379/266.01 |
| 6,263,051 B1 * | 7/2001 | Saylor et al. | 379/88.17 |
| 6,324,276 B1 * | 11/2001 | Uppaluru et al. | 379/220.01 |
| 6,327,346 B1 | 12/2001 | Infosino | 379/88.02 |
| 6,349,132 B1 | 2/2002 | Wesemann et al. | 379/88.17 |
| 6,381,329 B1 | 4/2002 | Uppaluru et al. | |
| 6,424,709 B1 | 7/2002 | Doyle et al. | 379/265.02 |
| 6,487,291 B1 | 11/2002 | Walker et al. | 379/266.02 |
| 6,502,745 B1 | 1/2003 | Stimson et al. | |
| 6,519,570 B1 * | 2/2003 | Faber et al. | 705/8 |
| 6,522,743 B1 | 2/2003 | Hurd | |
| 6,535,492 B1 | 3/2003 | Shtivelman | 370/270 |
| 6,606,596 B1 | 8/2003 | Zirngibl et al. | 704/270 |
| 6,658,093 B1 | 12/2003 | Langseth et al. | 379/88.17 |
| 6,711,249 B1 | 3/2004 | Weissman et al. | 379/221.06 |
| 6,826,173 B1 | 11/2004 | Kung et al. | |
| 6,826,276 B1 | 11/2004 | Brown et al. | |
| 6,842,767 B1 | 1/2005 | Partovi et al. | |
| 6,845,155 B1 | 1/2005 | Elsey | |
| 2002/0046030 A1 | 4/2002 | Haritsa et al. | 704/256 |
| 2002/0141561 A1 | 10/2002 | Duncan et al. | 379/220.01 |
| 2002/0147818 A1 * | 10/2002 | Wengrovitz | 709/228 |
| 2002/0164000 A1 | 11/2002 | Cohen et al. | 379/88.17 |
| 2003/0031309 A1 | 2/2003 | Rupe et al. | 379/265.02 |
| 2003/0053615 A1 | 3/2003 | Anderson et al. | 379/265.09 |
| 2003/0103618 A1 | 6/2003 | Brown et al. | 379/265.09 |
| 2003/0108162 A1 | 6/2003 | Brown et al. | 379/88.1 |
| 2003/0108185 A1 | 6/2003 | Brown et al. | 379/266.01 |
| 2003/0108186 A1 | 6/2003 | Brown et al. | 379/266.01 |
| 2003/0108187 A1 | 6/2003 | Brown et al. | 379/266.06 |
| 2004/0029567 A1 | 2/2004 | Timmins et al. | 455/412.1 |
| 2004/0057569 A1 | 3/2004 | Busey et al. | 379/265.09 |

FOREIGN PATENT DOCUMENTS

| | | | |
|---|---|---|---|
| EP | 0676882 A2 | | 10/1995 |
| JP | 8139797 A | | 5/1996 |
| JP | 10294784 A | | 11/1998 |
| WO | WO 9835507 | * | 8/1998 |

* cited by examiner

CALLER PROFILE — 90

VID - JANE SMITH 500-00-000

MUSIC PREFERENCE : CLASSICAL, LIGHT ROCK
NEWS PREFERENCE : HEADLINE NEWS
AGE : 30
SEX : F
EDUCATION : COLLEGE
OCCUPATION : ADVERTISING
SPECIAL NEED : NONE
GEOGRAPHICAL REGION : 12
PRODUCTS:
    COMPUTER A; APPLIANCE B; CABLE SERVICE C
MONTHLY WAIT HISTORY :
    30 MINS CLASSICAL MUSIC, SONGS A-G
    20 MINS HEADLINE NEWS, CNN
    40 MINS TRIVIA GAME, QUESTIONS 1-40 FROM GAMES R US
    50 MINS SURVEY, POLITICAL VIEWS ON SPORTS
    5 MINS LIGHT ROCK MUSIC
    10 MINS SPORTS NEWS
CURRENT WAIT HISTORY
    20 MINS QUEUE 1    -> TRANSFER TO QUEUE 3 - QUEUE 1 WRONG
    2 MINS QUEUE 3    CURRENTLY ON HOLD
MONTHLY TIME WITH REPRESENTATIVE
    AVERAGE TIME : 10 MINUTES
    LONGEST TIME: 30 MINUTES
    SHORTEST TIME: 2 MINUTES
ON HOLD POINTS = 20
MEMBERSHIP POINTS
    COMPANY A - 200
    COMPANY B - 300
    COMPANY C - 100

FIG. 5

CALL QUEUE WEB PAGE DIRECTORY DATABASE — 91

```
HELP        MODEM
                TYPE A
                    FAQ                     -> MODEM/TYPE A/FAQ
                    PROBLEM SOLVING
                        LIGHT               -> MODEM/TYPE A/PROBSOLVE/LIGHT
                        INITIALIZING        -> MODEM/TYPE A/PROBSOLVE/INITIALIZE
                        CONNECTION          -> MODEM/TYPE A/PROBSOLVE/CONNECT
                TYPE B
                    •
                    •
                    •
AB          NEW PRODUCT A
                GEOGRAPHICAL REGION 1       -> PRODUCTA/REGION1
                GEOGRAPHICAL REGION 10      -> PRODUCTA/REGION10
                    •
                    •
                    •
EXT         ACCESSORY A - ACCESSORY TO PRODUCT C       VENDOR 0010
VENDOR          FEMALE      -> VENDOR 0010/ACCESSORY A/ON HOLD/FEMALE
AB              MAIL        -> VENDOR 0010/ACCESSORY A/ON HOLD/FEMALE
```

FIG. 6

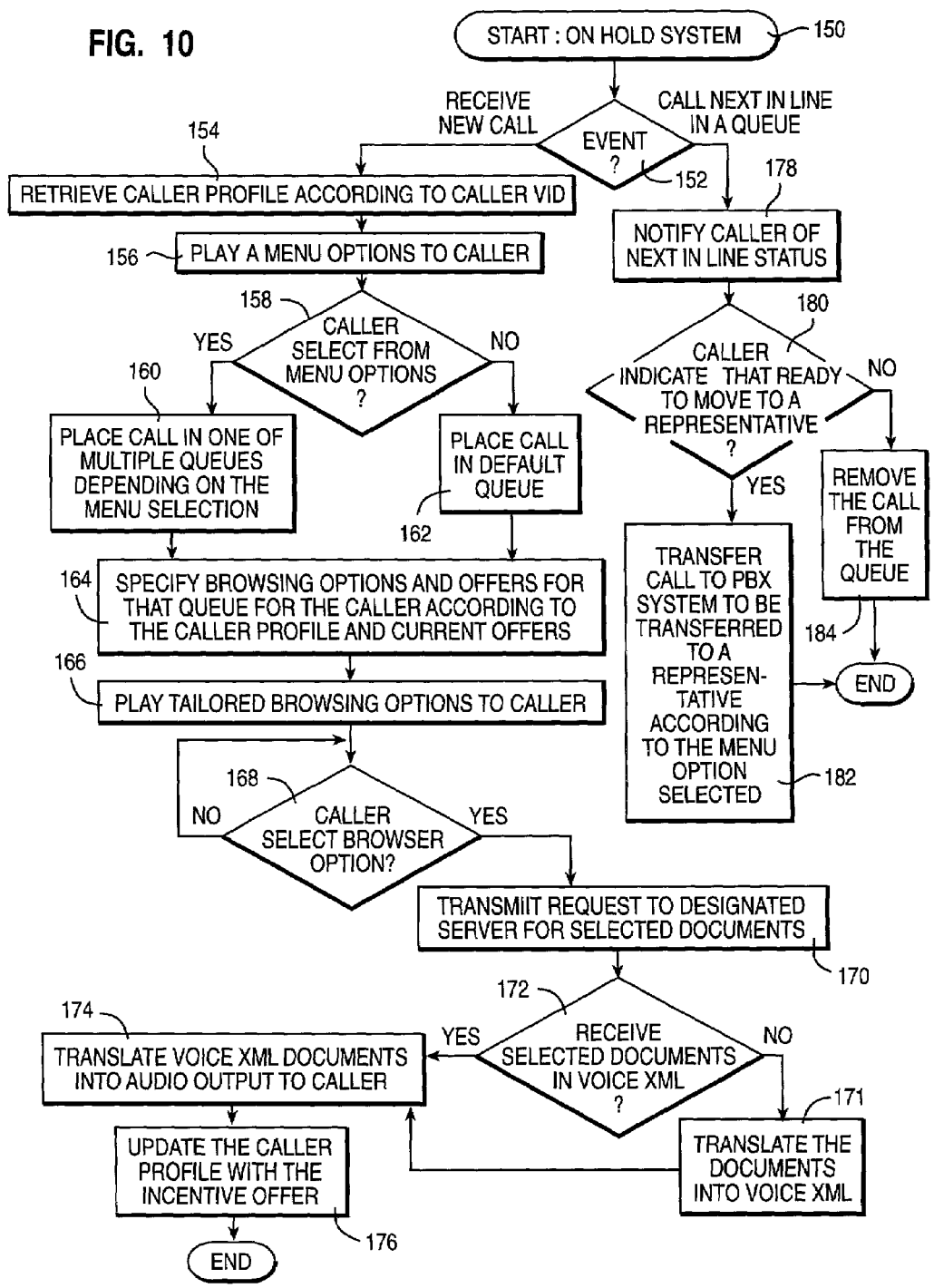

PROMOTING CALLER VOICE BROWSING IN A HOLD QUEUE

CROSS-REFERENCE TO RELATED APPLICATIONS

The present application is related to the following co-pending applications:
(1) U.S. patent application Ser. No. 10/015,380;
(2) U.S. patent application Ser. No. 10/015,266;
(3) U.S. patent application Ser. No. 10/015,382;
(4) U.S. patent application Ser. No. 10/015,383; and
(5) U.S. patent application Ser. No. 10/006,004, abandoned as of Apr. 6, 2005.

BACKGROUND OF THE INVENTION

1. Technical Field

The present invention relates in general to telecommunications and, in particular, to call hold centers. Still more particularly, the present invention relates to promoting caller voice browsing while a caller is waiting in a hold queue.

2. Description of the Related Art

Many companies provide telephone-based access to help staff, sales personnel, representatives, and automated menus via a call center. Where high telephone call traffic is typical in telephone access to a company's representatives, a PBX system receives the call and distributes the call to an automatic call distributor (ACD), thus incorporating a hold function in the call center. ACDs are often employed to provide an even and systematic distribution of incoming calls to multiple representatives. In particular, ACDs typically provide incoming calls with a direct connection to an available representative until all representatives are busy. Then, calling parties are placed in a call queue, and selectively connected to a representative once a representative comes available.

Call queues may cause frustration and ill will of consumers towards a company, particularly where excessively long waits, full queues and accidental disconnects are encountered. One way to alleviate some of the frustration associated with call queues is by allowing the caller to select from a menu of multiple services while waiting. Such services may include music, news, weather, release of a the line to call a third-party, transfer of the call to a chat room of other callers on hold, competitions, and other activities in which callers may participate while on hold. While participating in the services, the caller may receive periodic updates as to a position in the queue and an estimated wait time remaining.

In order to provide the caller with a menu of services, interactive voice response units (IVRU) are often utilized. For example, a caller placed in a queue of a call center may be enabled to access multiple entertainment options while on hold. An IVRU provides the caller with a menu of available entertainment options accessible while on hold. While IVRU systems provide a method for prompting a caller to select from a menu and then automating a transcript of information selected by the caller, IVRU systems are costly and are limited only to output of transcripted information. For example, a news transcript is output as a news service. However, the news transcript may not cover a particular news item of interest to the caller.

In view of the foregoing, it would be advantageous to provide a method, system, and program for allowing a caller to browse web pages while on hold in a call queue. In addition, it would be advantageous to provide a method, system, and program for allowing a caller to browse a selection of web pages that are specified for the caller according to a caller profile while the caller is on hold in a call queue. Further, it would be advantageous to promote browsing within the selection of web pages by providing incentives.

SUMMARY OF THE INVENTION

In view of the foregoing, it is therefore an object of the present invention to provide an improved telecommunications system.

It is another object of the present invention to provide a method, system and program for improved call hold queues.

It is yet another object of the present invention to provide a method, system and program for promoting caller voice browsing while a caller is on hold in a call queue.

According to one aspect of the present invention, at least one web page is selected for voice browsing by a particular caller waiting in a hold queue. Then, the particular caller is offered an incentive to voice browse the at least one web page, such that an on hold system housing the hold queue may promote voice browsing of specific web pages.

According to another aspect of the present invention, a call from a caller is received with an authenticated identity at a hold queue. A caller profile stored in association with the authenticated identity is accessed via a network. A voice XML script is specified according to the caller profile, such that voice browsing while waiting in the hold queue is specified for the caller.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 illustrates an illustrative embodiment of a caller profile in accordance with the method, system, and program of the present invention;

FIG. 6 depicts an illustrative embodiment of a call hold queue web page directory database in accordance with the method, system, and program of the present invention;

FIG. 10 depicts a high level logic flowchart of a process and program for controlling an on hold system in accordance with the method, system, and program of the present invention.

DETAILED DESCRIPTION OF THE PREFERRED EMBODIMENT

Figure 1:
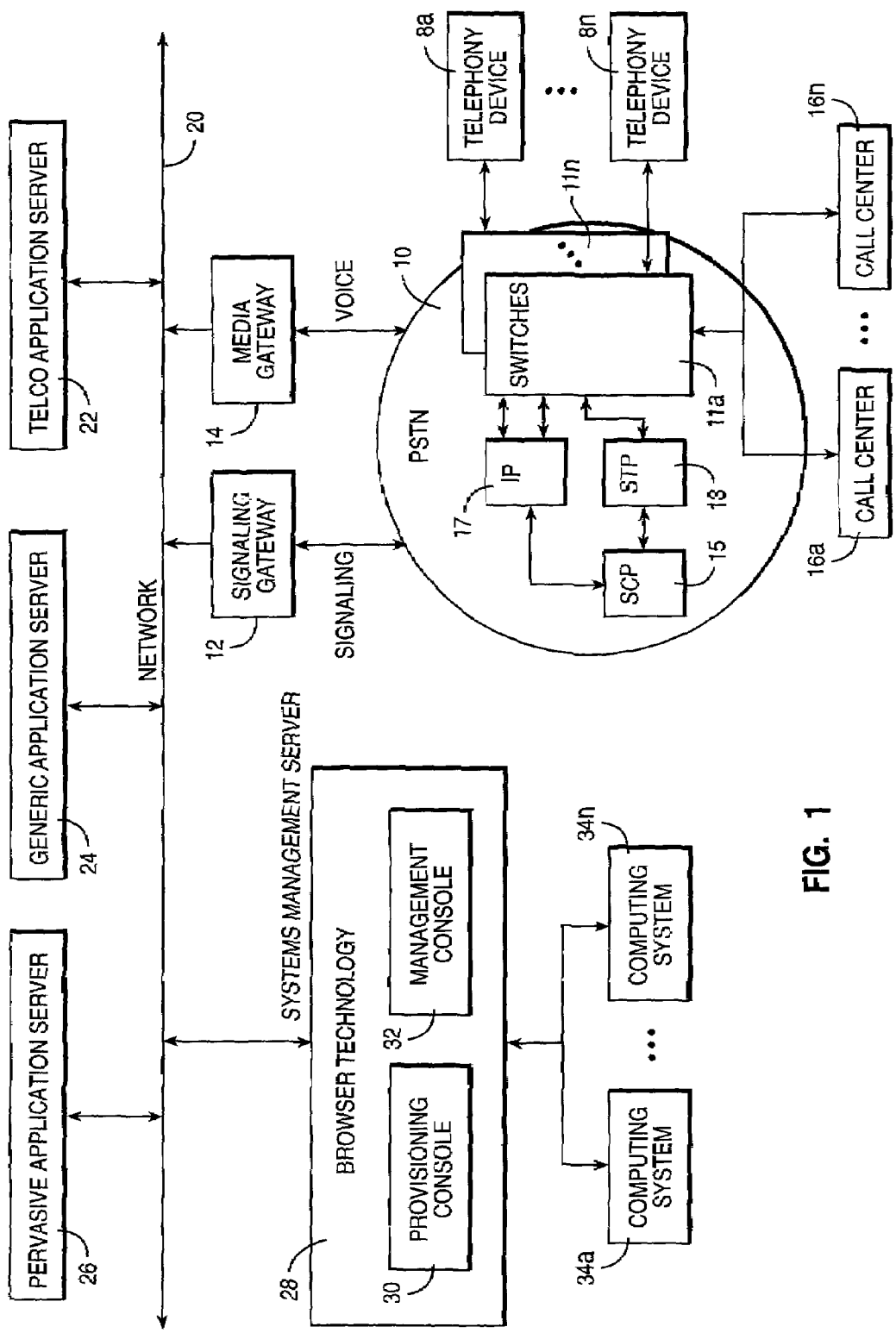
FIG. 1 illustrates of a telecommunications network in which the present invention may be implemented.

A method, system, and program for promoting caller voice browsing while a caller is waiting in a hold queue are provided. Advantageously, voice browsing allows a caller to browse web pages written in a voice extensible markup language (XML) language. In addition, voice browsing preferably provides for browsing web pages in other formats including, but not limited to, HTML, XML, Java and other scripting languages through transcoding the pages into voice XML or an alternate audio format.

In the present invention, a caller may voice browse the expanse of the web or may select from a specified range of web pages. An on hold system in which a caller is waiting may specify the range of web pages according to multiple criteria. In addition, in order to promote selection of the specified range of web pages, an incentive may be offered to a caller that is given to the caller in exchange for the caller browsing the selection.

The range of web pages may be specified according to a caller profile. A caller profile may include information about a caller including, but not limited to, personal information, purchase history, interests, on hold history, and incentives received. Preferably, the identity of a caller is first authenticated, such that the authenticated caller identity may be utilized to access the caller profile from a local or remote server system.

The range of web pages may also be specified according a subject of a call indicated by a caller. Preferably, a caller selects from a menu of call subjects. Then, web pages that are related to the subject may be specified for selection by the caller. By browsing pages related to the subject, a caller may find an answer to the question prompting the current call and hang up before requiring the attention of a representative.

In addition, an on hold system may also specify a selection of web pages in order to promote a product or service or allow another company to promote a product or service. These Aadvertising@ type of pages may further be specified according to the caller profile and subject of the call. For example, one set of browsable pages for a particular product may be targeted towards a younger set of people and another set of browsable pages for a particular product targeted towards an older set of people. The set of browsable pages that is selected for a particular caller is preferably selected according to an age indicated in the caller's profile.

Incentives offered to promote browsing of a specified selection of web pages may include, but are not limited to, hold queue position adjustments, membership points, cash values, electronic coupons, and other values that may be redeemed while the caller is on hold or may be stored with a caller profile for future redemption.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

The present invention may be executed in a variety of systems, including a variety of computing systems and electronic devices under a number of different operating systems. In one embodiment of the present invention, the on hold call queue system is a computer system that incorporates communication features that provide telephony, messaging, and information services to a plurality of callers. In general, the present invention is preferably executed in a computer system that performs computing tasks such as manipulating data in storage that is accessible to the computer system.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

General Network Environment

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information from one service provider to the next without security features.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via network 20 is totally untrusted and therefore may require authentication and additional security.

In the present invention, network 20 may comprise a private network, Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a–8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a–34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other biometric methods. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

PSTN Identity Authentication and Call Control

Looking into PSTN 10, a telephone network typically includes multiple switches, such as central office switches 11a–11n, that originate, terminate, or tandem calls. Central office switches 11a–11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a–11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP initiates an announcement to a caller to identify themself to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a–11n may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a subscriber may be authenticated according to passwords, eye scans, encryption, and other biometric methods.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15. In addition, as previously described, caller authentication to determine VIDs and RVIDs may be performed by a third party, such as telco application server 22.

An origin telephony device or destination telephony device may also determine a VID and/or RVID for the caller and/or callee of a call. In particular, telephony devices 8a–8n and call centers 16a–16n may function as origin and designation telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a–8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a–8n.

In addition, telephony devices 8a–8n may each incorporate a display that provides a visual output of a VID or RVID. Alternatively, such a display may be provided in a separate device connected to the line in parallel to telephones 8a–8n. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8a–8n are communicatively connected to PSTN 10 via wireline, wireless, ISDN, and other communication links. Preferably, connections to telephony devices 8a–8n provide digital transport for two-way voice grade type telephone communications and a channel transporting signaling data messages in both directions between telephony devices 8a–8n and PSTN 10.

In addition to telephony devices 8a–8n, advanced telephone systems, such as call centers 16a–16n, may be communicatively connected to PSTN 10 via wireline, wireless, ISDN and other communication links. Call centers 16a–16n may include PBX systems, hold queue systems, private network systems, and other systems that are implemented to handle distribution of calls to multiple representatives or agents.

Returning to central office switches 11a–11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a–11n. The assigned telephone number includes the area code (NPA) and exchange code (NXX) for the serving central office and four unique digits (XXXX).

Central office switches 11a–11n utilize office equipment (OE) numbers to identify specific equipment, such as physical links or circuit connections. For example, a subscriber's line might terminate on a pair of terminals on the main distribution frame of one of central office switches 11a–11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to forward the call if appropriate, to apply distinctive ringing, etc.

In the present invention, when a central office switch detects an off-hook condition on a line, the central office switch will then determine if a VID signal is transferred from the off-hook telephony device. If a VID is transferred, then a query is made to SCP 15 according to the VID for any services specified for the authenticated subscriber. Alternatively, a query may be transferred via network 20 to an external server, such as system management server 28, to determine the services specified for the caller. The central office switch will then receive the dialed digits from the off-hook line terminal and route the call, providing services according to those preferred by the authenticated subscriber.

Alternatively, if a VID signal is not transferred from the off-hook telephony device, then the central office switch will provide a dial tone and transfer the call to an IP that prompts the caller to provide a voice entry or other identification. Alternatively, the central office switch may transfer the call to telco application server 22 for use of the caller authentication service. In either case, the identity for the subscriber is preferably authenticated, the call is transferred back to the central office switch, services are provided according to the VID authenticated for the subscriber, and the call is routed according to dialed digits from the off-hook line terminal.

In addition, an RVID may be provided in the present invention to authenticate the identity of a callee receiving the call. When a call is answered, the call is transferred back to an IP or telco application server 22 to authenticate the identity of the callee answering the call.

As another alternative to dialed digits from the off-hook line terminal, a caller may utilize a voice calling function of a telephony device for indicating how the call should be routed. For example, a caller may say the name of a preferred callee. The device or IP 17 may determine a person within the caller's calling list that matches the voiced name. The matching person's digits are then utilized to route the call.

Call Center Environment

Figure 2:
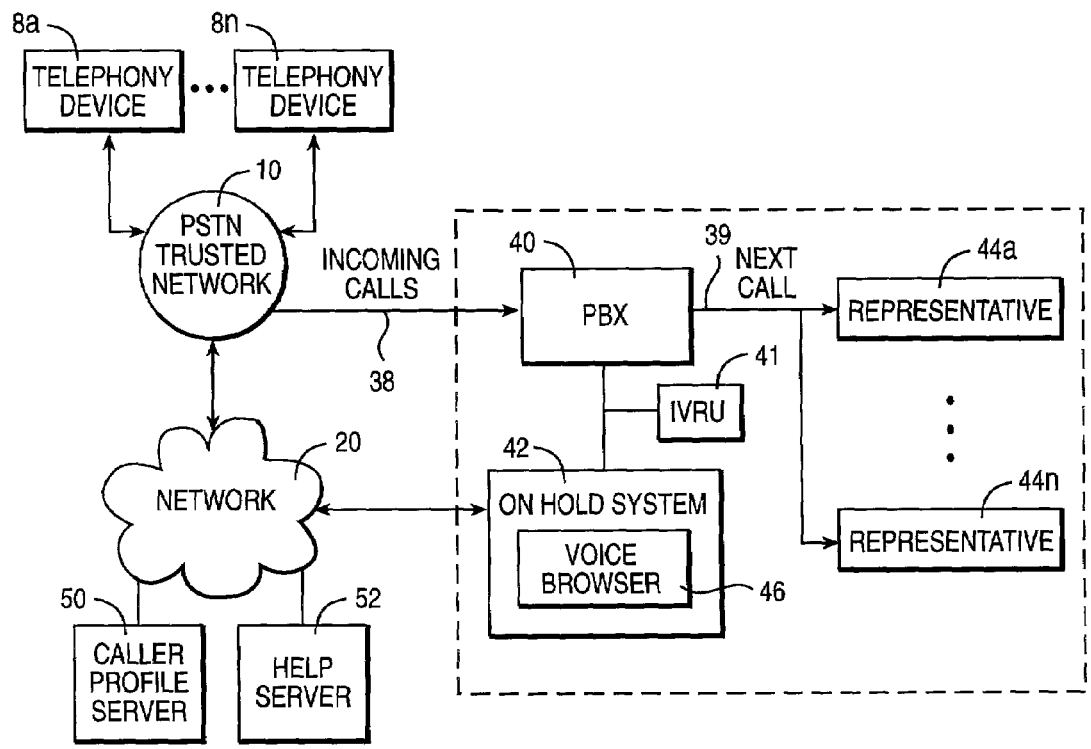
FIG. 2 depicts a block diagram of a network call or contact center system in which the present invention may be implemented.

Referring now to FIG. 2, there is an illustrative network call center environment in which the present invention may be implemented. It will be appreciated by one with skill in the art that although a particular call center environment is described below, the invention is not limited to use within the described network environment, rather, the inventive queue position advancement process may be implemented within any on-hold information service regardless of the telephony environment.

As illustrated, multiple incoming calls are received at a call center 16a. In particular, a connection 38 includes a voice trunk and a signal link, such that both voice and VID signals may be received at PXB 40 from PSTN 10. Connection 38 is preferably connected to PSTN 10 via a wireline, wireless, Internet Protocol network, or other connection. PBX 40 distributes incoming calls to multiple representative terminals 44a–44n via connection 39, wherein connection 39 also includes a voice trunk and a signal link. In particular, PBX systems, and in particular PBX systems with automatic call distribution (ACD) ability, are well known in the art as switching systems designed to received telephone calls destined for call center 16a and to queue those call when a call handling agent is not available.

In the description which follows, it will be assumed that all representative terminals 44a–44n are busy and therefore PBX 40 cannot respond to an incoming call by making a direct connection to one of representative terminals 44a–44n. As a result, PBX 40 is forced to place the incoming call on hold. However, an advantage of the present invention is that when a call is transferred to one of representative terminals 44a–44n, the VID for the call is also transferred, enabling a representative to receive an authenticated identity of a caller. Additional authentication may be required by PBX 40 where callers are accessing sensitive information from representatives.

After placing the incoming call on hold, the VID, time of call, and other information received by PBX 40 are forwarded to on hold system 42. On hold system 42 preferably creates a record based on the call and positions the call within one of call queues 46a–46n. In particular, the call queue selected for a call is specified by a caller indication of the subject matter of a call. In addition, a single call queue may be utilized to store all calls on hold.

While in the present embodiment PBX 40 forwards calls to a single on hold system, in alternate embodiments, PBX 40 may forward calls to multiple on hold systems and to multiple call centers. In addition, on hold system 42 and other on hold systems may be coupled to PBX 40 or may be remotely accessed by PBX 40. Further, while in the present embodiment on hold system 42 is depicted as an independent system, on hold system 42 may also be incorporated within PBX 40.

While the call is on hold, an interactive voice response unit (IVRU) 41, coupled to PBX 40 and on hold system 42, may offer the caller a menu of available options for receiving call hold queue information for on hold system 42. In general, IVRU 41 is a voice information system which may be arranged to (i) prompt a caller for specific information by asking questions based on a set of modules in a transactions script, (ii) collect that information by detecting and interpreting dual tone multifrequency (DTMF) signals entered by the caller or by recognized speech input by the caller, (iii) organize the collected information in a specific format and (iv) forward the collected information to be utilized within on hold system 42. For purposes of the present invention, prompts to the caller may be in voice, text, video, and/or graphical formats depending on the interface receiving the prompt. In addition, for purposes of the present invention, a voice browser may be implemented to interact with a caller according to voice XML scripted pages.

According to one advantage of the present invention, a caller profile according to the VID may be accessed by on hold system 42 from a caller profile server 50 and/or from a local caller profile database accessible to on hold system 42. On hold system 42 may then utilize the caller profile to specify the menu of available options and other services provided to the caller while the caller is on hold.

Caller profile server 50 preferably includes profiles for multiple callers stored according to VIDs that are accessible across multiple call centers 16a–16n. Caller profile server 50 may be located within the extended network of PSTN 10 as a database that is preferably shared across multiple service providers accessible via an Intranet. Alternatively, as depicted, caller profile server 50 may be located in the external network of PSTN 10, where the external network is available via network 20. As illustrated, on hold system 42 accesses caller profile server 50 via network 20.

As illustrated, on hold system 42 accesses caller profile server 50 via network 20. Advantageously, by storing caller profiles in caller profile server 50 according to VID, only a single identifier is needed to access a caller profile and only a single location is provided for access to a caller profile. Further, advantageously, a caller is only required to enter preferences and other information in one place, for storage according to VID, where the information is then accessible to multiple diverse call centers and other systems. As an additional advantage, different portions of a caller profile may be stored in different server system locations, but each referenced for a single caller according to that caller's VID.

Advantageously, in addition to recording on hold activity according to VID in a caller profile, other network activity performed by the caller may be recorded according to VID in a caller profile. For example, an individual may be required to provided a voice sample in order to determine a VID for logging onto a network via a computer system. Web pages accessed by the caller via the network connection are preferably logged according to the VID in the caller's profile. Alternatively, for an individual to access a particular web site, the individual may be required to provide a voice sample that is authenticated to determine a VID for logging onto the particular web site. In either case, the activity of an individual according to VID may be stored in a caller profile accessible to other network servers and to call centers.

Monitoring a caller's use of a website is particular advantageous such that the advertising that has been displayed, the links selected, and documents downloaded may be monitored according to VID. For example, where an individual accesses a web site for ACompany G@, an advertisement from a Aproduct A@ is displayed and the individual selects to view two pages from the site. When the individual's VID is identified for a call five minutes later and the caller is placed on hold, it is advantageous to know what information the caller has already received from the web site, such that the caller is not redirected to the same information via a voice browser while on hold. Further, it is advantageous for other vendors to know what web sites a caller has already visited, such that those vendors may offer the caller incentives to visit web sites with related, but competing, products and service.

In addition, by storing records of voice browsing and web browsing according to VID in a caller profile, a caller may access a page previously browsed via either interface. Further, call centers may specify voice browsing of news, music and other selections in view of other browsing via voice or web browser, that a caller has already performed within a particular period of time.

According to one advantage of the present invention, a voice browser 46 is also implemented within on hold system 42. Voice browser 46 is utilized for browsing the Internet and in particular for browsing pages stored at a help server 52.

Help server 52 preferably includes web scripts that may be output to multiple devices including computer systems via a web browser and telephony devices via a voice browser. In particular, the scripts may include help information that is searchable by a user through a web browser, but is also searchable by a caller via a voice browser.

For an IVRU to play the help information to a caller, the information would need to be stored in a script that is readable by the IVRU. In addition, redundant copies of the same information would be stored in multiple places including the web server and the IVRU. However, according to the present invention, browsable scripts only need be stored in one location to service callers and web surfers.

Figure 3:
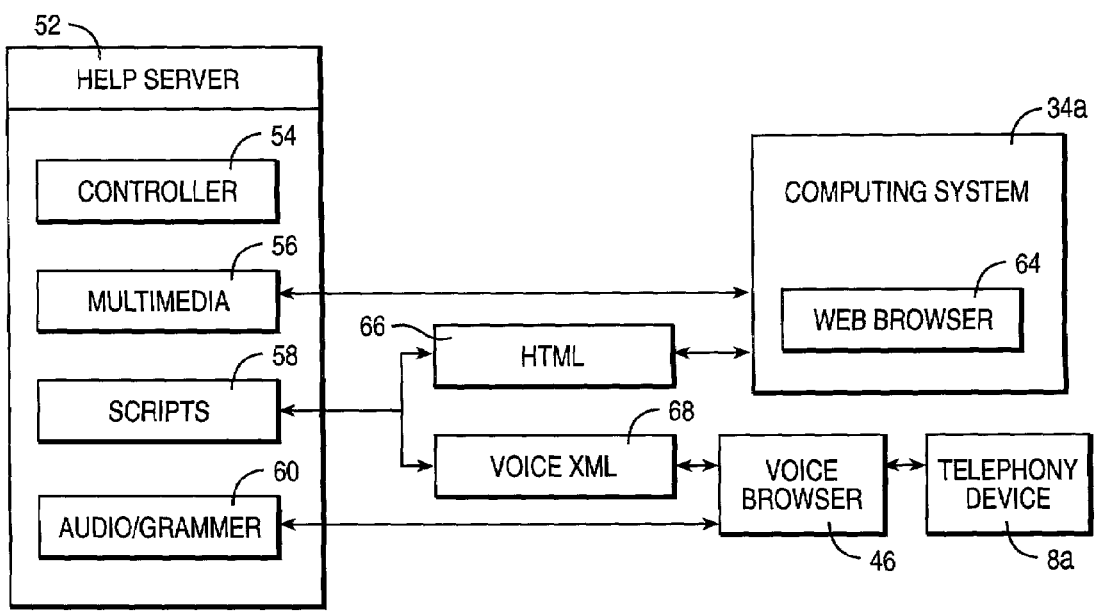
FIG. 3 illustrates a block diagram of a voice browsing system in accordance with the method, system, and program of the present invention.

With reference now to FIG. 3, there is an illustrative block diagram of a voice browsing system in accordance with the method, system, and program of the present invention. For purposes of the present invention, help server 52 is a web based server communicatively connected to network 20. As depicted, help server 52 includes a controller 54 for controlling the operations of help server 52. In particular controller 54 may include at least one processor, memory, data storage, system software, and application software that function together to perform the processes of controller 54.

In addition, help server 52 includes multimedia database 56 and audio/grammar database 60. Multimedia database 56 may include graphics, sound, video and other data that may be read by a web browser 64 executing on computing system 34a. Help server 52 also includes audio/grammar database 60 for directing voice browser 46 in converting voice XML into audio output.

Further, help server 52 includes scripts 58. Scripts 58 includes programmed web pages that may be output as HTML documents 66 or voice XML documents 68. HTML documents 66 are preferably transmitted to a computing system for output via a display interface controlled by web browser 64. Voice XML documents are preferably converted into audio output by voice browser 46 and output via telephony device 8a. Telephony device 8a may include a wireline phone, a wireless phone, a PDA with telephony features, and other computing devices with telephony features that provide audio input and output.

In the present invention, scripts 58 preferably include information including, but not limited to, directions, frequently asked questions, product and service specifications, product and service advertising, and other information which may be visibly and audibly output. Scripts 58 are preferably designed in a hierarchy according to subject, such that a user or caller may easily transition from one page to the next within a particular subject. Further, scripts 58 allow for a user of computing system 34a or a caller from telephony device 8a to receive the same help information, presented at different interfaces.

In addition, in the present invention, voice browser 46 includes audio output (computer-synthesized and/or recorded) and audio input (voice and/or keypad tones). Importantly, voice browser 46 connects the Internet with a phone network in order to extend the power of the web to telephony devices while a call placed via those telephony devices is waiting on hold.

In general, XML is advantageous because a web page programmed in XML may be individually specified for each caller. In the present example, voice browser 46 may utilize the caller profile received for each caller to individually specify output of voice XML based web pages to callers. For example, the name of the caller is preferably included in a caller profile or VID. Where the voice XML 68 includes entries for the name of a caller or other personalized information, voice browser 46 preferably inserts a name according to a VID or caller profile associated with a VID.

Figure 4:
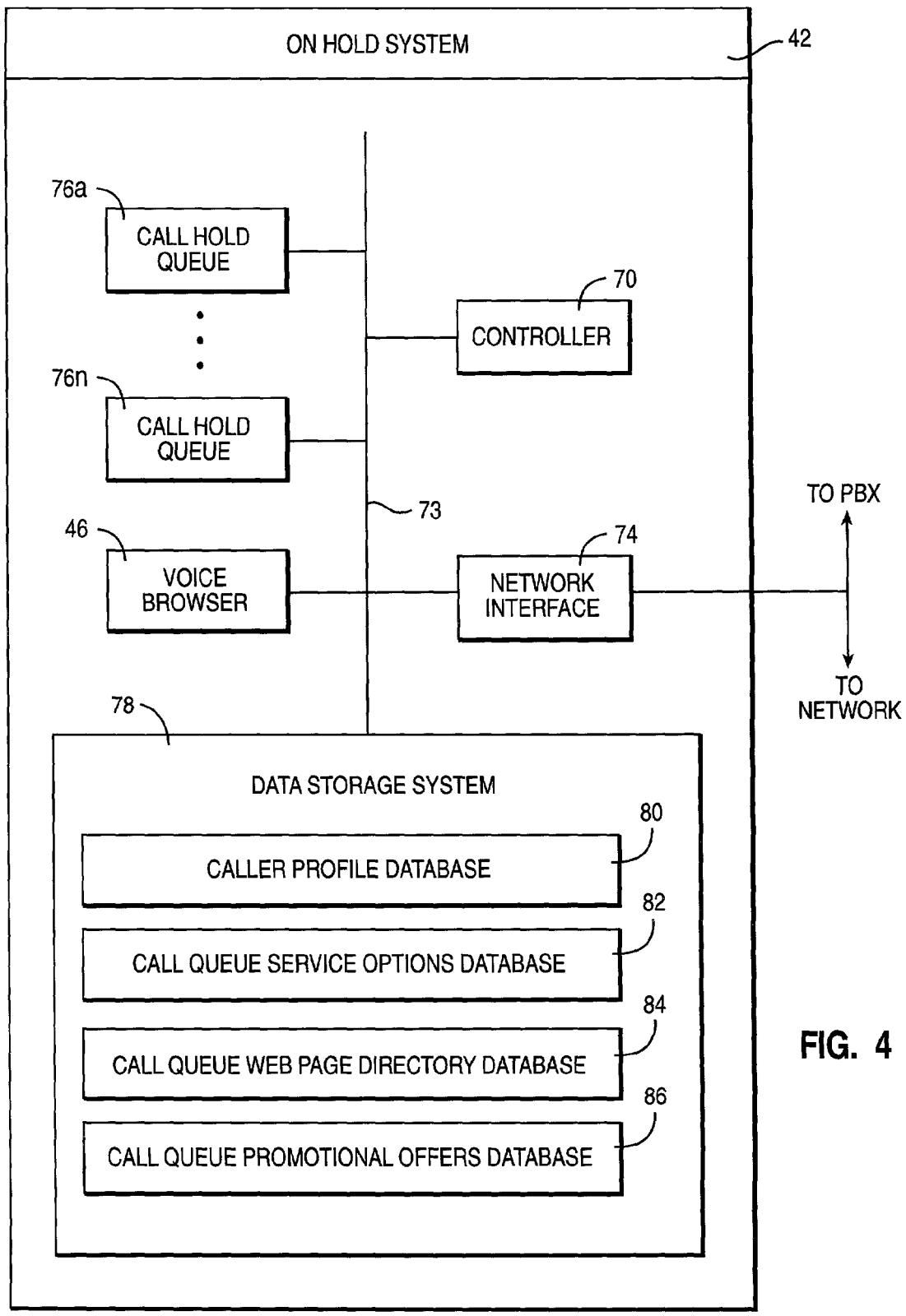
FIG. 4 depicts a block diagram of an on hold system in accordance with the method, system, and program of the present invention.

Referring now to FIG. 4, there is an illustrative block diagram of an on hold system in accordance with the method, system, and program of the present invention. As illustrated, on hold system 42 includes a controller 70, call hold queues 76a–76n, a network interface 74, voice browser 46, and a data storage system 78 communicatively connected via a bus 73. Additional systems may be connected along bus 73 that are not depicted herein. In particular, controller 70 comprises conventional computer resources including, but are not limited to, at least one processor, memory, a data storage system, system software and application software, that function together to perform the functions described with reference to controller 70.

Network interface 74 preferably communicates with PBX 40 via a telephone network and network 20 via a network connection such as a wide area network (WAN) connection. In particular, network interface 74 receives transfers of calls from PBX 40 and then returns calls to PBX 40 when a call is the next in line within one of call hold queues 76a–76n.

In the present invention, voice browser 46 preferably controls audio output and detects audio inputs of voice and/or keypad tones. In particular, voice XML documents for controlling initial menu options to a caller may be stored in call queue service options database 82. Alternatively, such voice XML documents may be stored remotely, such as at help server 52, and accessed via network 20.

For example, when a call is first received at on hold system 42, a first voice XML scripted document may be utilized to prompt and direct the placement of a call within one of call hold queues 76a–76n. In particular, a caller may be given the option of selecting between multiple subject matters or skills, where each of call hold queues 76a–76n is specified according to a subject matter or skill. When calls are next in line to be transferred to a representative, the subject matter or skill of the queue determines which representatives may receive the call.

Then, depending on the call hold queue, multiple service options are presented to the caller according to a voice XML scripted document controlled by voice browser 20. Service options may include, but are not limited to, browsing web pages specified by the on hold system for an incentive, browsing the web in general, listening to music, news or weather, making a third-party call, and other activities.

According to an advantage of the present invention, the subject and service options are first filtered according to the caller profile associated with the caller VID, such that the caller is only presented with those options that are specifically designated by the caller and those options which are tailored to the caller according to the caller profile. Caller profiles may be stored in caller profile database 80 and/or accessed from a remote caller profile server via network 20.

In addition, to filtering subject and service options to only present preferred types of options, any output directed by voice browser 46 to a caller may be specified by a caller's profile. In particular, the language, dialect, speed, volume and other characteristics of output to a caller may be specified by the caller's profile.

Where the caller selects to browse web pages specified by the on hold system for an incentive, at least one web page or set of web pages is preferably specified for a caller. In the present invention, the sets of web pages may include Ahelp@ type web pages and Aadvertising@ type web pages, where both types of pages may be specified according to a caller profile and the subject of the hold queue.

Call queue web page directory database 84 advantageously organizes the multiple browseable web pages according to topic, type of web page, content of web page, age target of web page, vendor information, and other sortable criteria. Voice XML scripts may also be included in call queue web page directory database 84 for directing the caller to select from a hierarchy of web pages. Controller 70 preferably compiles selections of web pages from call queue web page directory for each caller.

AHelp@ type web pages are advantageous because the caller may find the answer to the question prompting the current call, and then hang up without requiring service from a representative. For example, where a caller selects Amodem problems@ from the menu, a caller's profile may indicate the type of modem or the caller may further indicate the type of modem. Web pages that are tailored to the type of modem may then be specified for the caller.

AAdvertising@ type web pages are advantageous because a vendor may promote a particular product or service. For example, a vendor may have a new product, where every caller is offered with an incentive to browse pages about the new product. Alternatively, a caller profile may indicate that a caller owns a product that a particular vendor provides accessories for. The on hold system may then specify web pages that advertise the accessories for that particular caller.

In addition, a third party vendor may be allowed to promote a product or service to callers. Advantageously, a caller profile stored according to VID indicates the times and places that a caller has been exposed to a advertising by different vendors, such that those advertisements may or may not be repeated. In addition, as previously described, a caller profile may record, according to VID, advertisements viewed via a web browser. In particular, the portion of a caller profile indicating exposure to the vendor may be stored at a server managed by the vendor according to a caller VID, but accessible to multiple call centers.

According to an advantage of the present invention, on hold systems may allow multiple external vendors to add Aadvertising@ type web pages to call queue web page directory 84, where those pages are accessed from external vendor servers accessible via network 20. An on hold system may require external vendors to pay a fee for adding web pages to the directory and may also charge a fee per caller access. In the previously describe example where web pages are specified that advertise accessories for a product owned by a particular caller, those web pages may be specified according to external vendor advertising web pages logged in call queue web page directory 84.

In the present invention, promotional offers or incentives may be made to callers to browse a set of web pages or a particular web page. Call queue promotional offers database 86 advantageously includes criteria for making offers. Criteria for making offers may include a caller profile, a call hold queue selected, and the promotional goals of the vendor running on hold system 42. In particular, external vendor logging pages into call queue web page directory 84 may indicate criteria for making offers to callers, wherein external vendors reimburse offers.

Offers may include values that are redeemable while the caller is on hold. For example, a value may designate a particular number of on hold positions that a caller will be advanced within the hold queue, in addition to natural advancement within the hold queue. In addition, offers may include values that are redeemable at a future time. For example, membership points that may be exchanged for products or services may be provided.

With reference now to FIG. 5, there is an illustrative embodiment of a caller profile in accordance with the method, system, and program of the present invention. As depicted, a caller profile 90 is preferably specified for a particular caller VID. Entries within caller profile 90 include preferences, personal information, products purchased, wait histories, and membership points. In addition, alternate types of information advantageous for carrying out the present invention, although not depicted herein, may be included within caller profile 90.

According to an advantage of the present invention, an on hold system accesses caller profile 90 in order to specify selections of browsable web pages for a caller. In particular, according to the examples of entries within caller profile 90, selections of browseable web pages for a caller may be specified according to music preferences, news preferences, age, sex, education level, occupation, geographical region, and products purchased.

According to another advantage of the present invention, incentives that are provided to callers, in exchange for browsing selected web pages, may be transmitted according to a caller VID for storage in caller profile 90. By storing membership points or other incentives in caller profile 90, those membership points are accessible by a caller across multiple call centers and other systems accessible via network 20. In addition, according to the advantage of a VID, a caller need only authenticate an identity at any of multiple call centers to access caller profile 90 and redeem membership points.

In the example, membership points are designated according to the company granting the points. In alternate examples, membership points may be categorized and stored according to other criteria.

Referring now to FIG. 6, there is an illustrative embodiment of a call hold queue web page directory database in accordance with the method, system, and program of the present invention. As depicted, the examples of entries within a database 91 include help, advertising, and external vendor entries.

Advantageously, web page selections may be arranged in a hierarchy, as illustrated in the help entry, where a voice XML script may be utilized to guide a caller through the hierarchy. For example, where a caller first selects a hold queue for modems, then the type of modem may be determined from a caller profile or caller entry. If, for example, the caller is calling in reference to modem Atype A@, the caller may then be prompted to select from among the hierarchy of help options for modems of Atype A@.

In addition, advantageously, web page selections may be arranged in the hierarchy, as depicted in the advertising example, where a specific page within the hierarchy is selected and offered to the caller. For example, a new product A may be offered to the caller independent of the hold queue selected by the caller. However, the web page specifically offered to the caller may be specified according to the caller's geographical region, which is accessible from the caller profile and/or caller location context information included in a VID.

Further, external vendor advertising may be offered to a caller. In the example, if a caller profile indicates that the caller owns product C, then the web pages for accessory A, offered by vendor A0010" for product C, are specified according to the gender of the caller. A vendor's external server may be accessed to obtain the voice browsable web pages.

Figure 7:
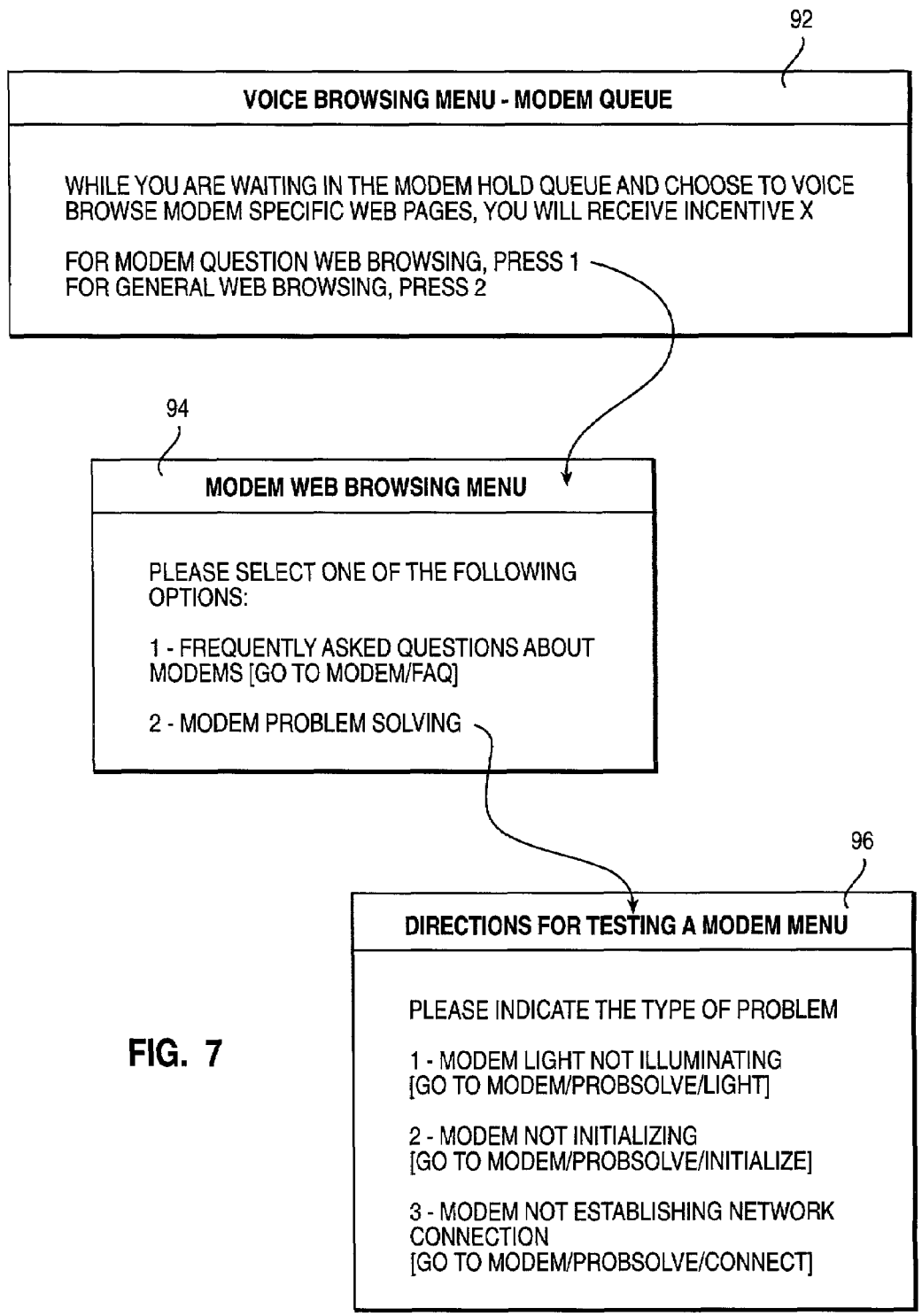
FIG. 7 illustrates an illustrative embodiment of scripts that may be utilized to direct caller browsing according to a queue subject in accordance with the method, system, and program of the present invention.

With reference now to FIG. 7, there is an illustrative embodiment of scripts that may be utilized to direct caller browsing according to a queue subject in accordance with the method, system, and program of the present invention. As depicted, scripts 92, 94, and 96 are voice XML scripted documents specified for a particular caller.

Script 92 indicates that a caller may receive a particular incentive in general for selecting to browse modem specific web pages. In addition, or alternatively, individual incentives may be specified for browsing each web page.

Preferably the caller is asked to select from among options with designated voice or keypad inputs. For example, if a caller in the modem call hold queue inputs a A1@, the voice browser will start the next script, illustrated in block 94. If a caller in the modem call hold queue inputs a A2", then the voice browser will start a script asking the caller to designate a web page address to browse.

The voice XML script requested by a voice browser in response to a caller input is indicated in brackets. In block 94, where the caller in the modem call hold queue inputs a A1@, the voice browser will request a voice XML document stored in a web page hierarchy at Amodem/faq@. Alternative types of addressing may be utilized for requesting pages.

In block 94, if a caller inputs a A2", then the voice browser will start the next script, as illustrated in block 96. By providing multiple levels of options, the script may prompt the caller to narrow the caller's question to the most relevant information and then retrieve a voice XML script for the web page with the most relevant information.

Figure 8:
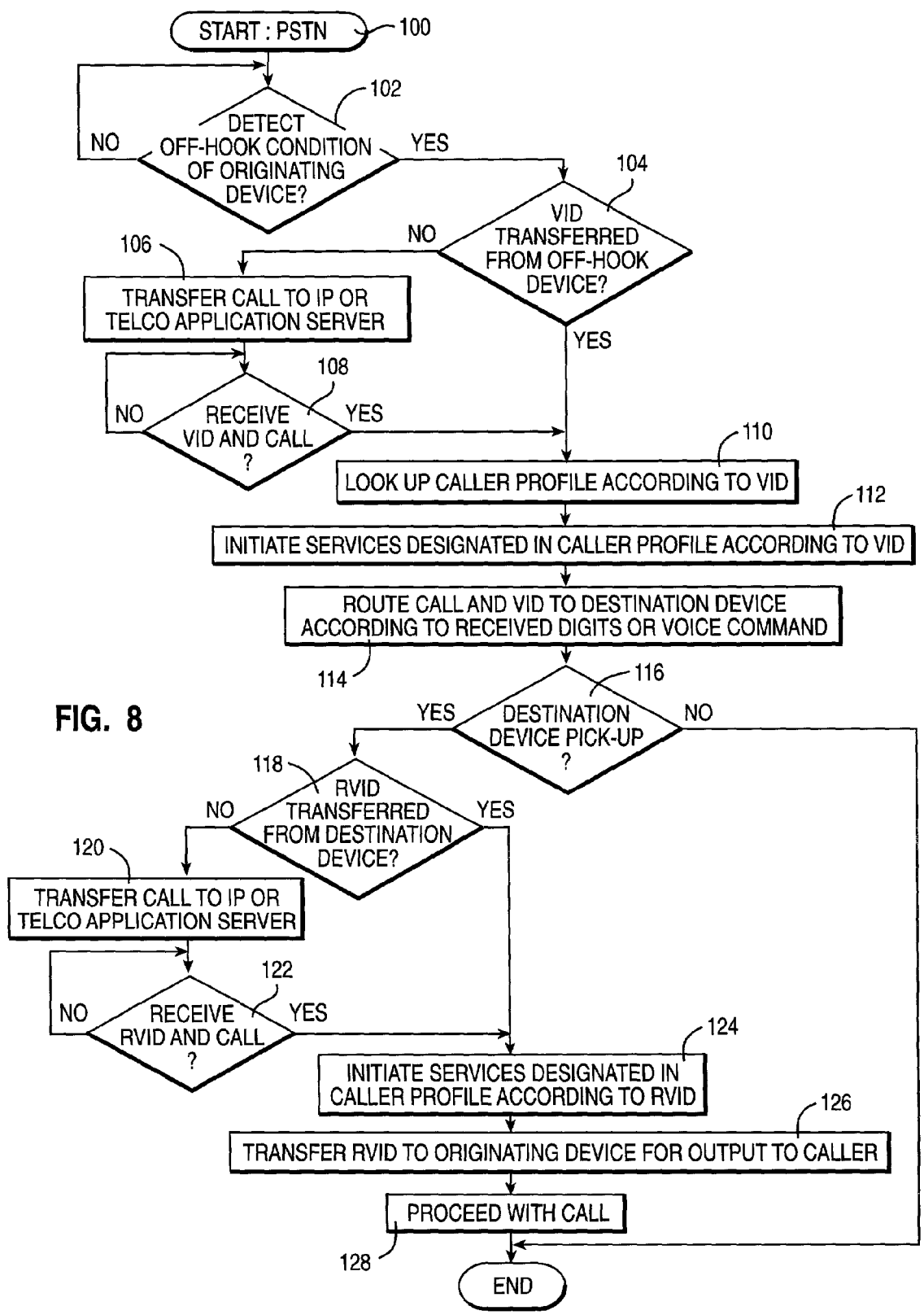
FIG. 8 depicts a high level logic flowchart of a process and program for controlling a switching network in accordance with the method, system, and program of the present invention.

With reference now to FIG. 8, there is depicted a high level logic flowchart of a process and program for controlling a switching network in accordance with the method, system, and program of the present invention. As illustrated, the process starts at block 100 and thereafter proceeds to block 102.

Block 102 illustrates a determination as to whether an off-hook condition is detected in association with an originating telephony device. If an off-hook condition is not detected, then the process iterates at block 102. If an off-hook condition is detected, then the process passes to block 104.

Block 104 depicts a determination as to whether a VID is transferred from the off-hook device. The originating telephony device may authenticate an identity for a caller. However, the PSTN or other servers connected thereto may require additional authentication within a trusted network for access to certain types of services. If a VID is received and no additional authentication is required, then the process passes to block 110. If a VID is not received or if the PSTN requires additional authentication, then the process passes to block 106. Block 106 illustrates transferring the call to an intelligent peripheral or a telco application server for authentication. Block 108 depicts a determination as to whether the VID and the call are returned to the switching center. If not, then the process iterates at block 108. If the VID and the call are returned, then the process passes to block 110.

Block 110 depicts looking up the caller profile according to VID. The caller profile may be stored in a database within the PSTN, in an extended network to the PSTN or in a network external to the PSTN. Next, block 112 illustrates initiating services designated in the caller profile retrieved according to the VID. Thereafter, block 114 depicts routing the call and the VID to a destination device according to received digits or a voice command, and the process passes to block 116.

Block 116 illustrates a determination as to whether the destination device is detected with a pick-up (off-hook) condition. If the destination device does not pick-up, then the process end s. If the destination device does pick-up, then the process passes to block 118.

Block 118 depicts a determination as to whether an RVID is transferred from the destination device. If the RVID is transferred, then the process passes to block 124. If not, then the process passes to block 120. Block 120 illustrates transferring the call to an intelligent peripheral or telco application server. Next, block 122 depicts a determination as to whether an RVID and call are received back at the switching center. If not, then the process iterates at block 122. When the RVID and call are received, then the process passes to block 124.

Block 124 illustrates initiating services designation in a caller profile associated with the RVID. Next, block 126 depicts transferring the RVID to the originating device for output to the caller. Thereafter, block 128 illustrates proceeding with the call, where additional services are applied when applicable, and the process ends.

Figure 9:
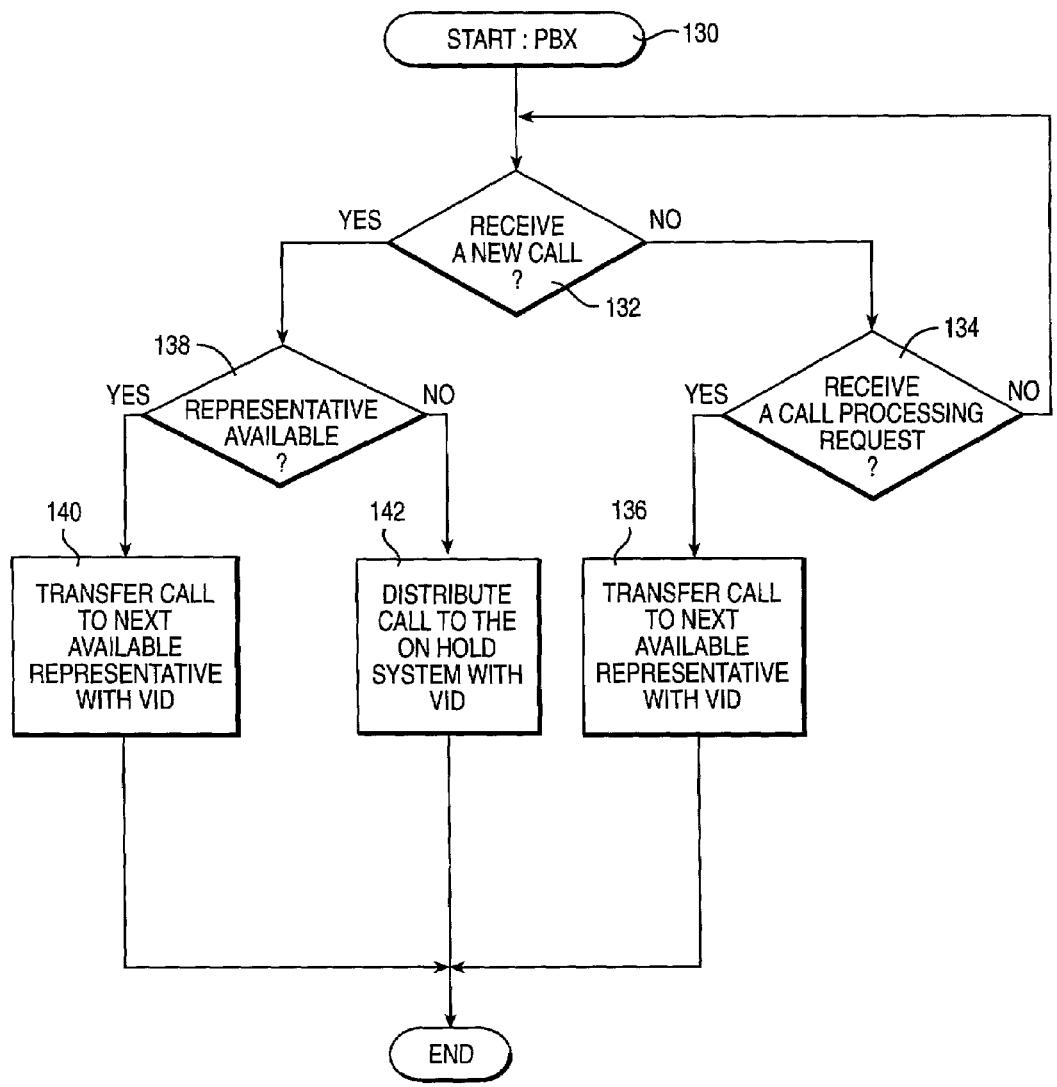
FIG. 9 illustrates a high level logic flowchart of a process and program for controlling a PBX system within a call center in accordance with the method, system, and program of the present invention.

With reference now to FIG. 9, there is depicted a high level logic flowchart of a process and program for controlling a PBX system within a call center in accordance with the method, system, and program of the present invention. As illustrated, the process starts at block 130 and thereafter proceeds to block 132.

Block 132 depicts a determination as to whether a new call is received. If a new call is received, then the process passes to block 138. If a new call is not received, then the process passes to block 134. Block 134 illustrates a determination as to whether or not a call processing request is received. When a call is at the top of the call queue, the call is preferably transferred back to the PBX with a call processing request. If a call processing request is not received, then the process passes to block 132. If a call process request is received, then the call is transferred to the next available representative with a VID, as depicted at block 136, and the process ends.

Block 138 illustrates a determination as to whether or not a representative is available. If a representative is available, then the call is transferred to the next available representative with a VID, as illustrated at block 140, and the process ends. If a representative is not available, then the process passes to block 142. Block 142 illustrates distributing the call to the on hold system with the VID, and the process ends.

With reference now to FIG. 10, there is depicted a high level logic flowchart of a process and program for controlling an on hold system in accordance with the method, system, and program of the present invention. As illustrated, the process starts at block 150 and thereafter proceeds to block 152.

Block 152 depicts a determination as to what event occurred when an event occurs. If a new call is received, then the process passes to block 154. If a call is detected as being the next in line in a queue, then the process passes to block 178.

Block 154 illustrates retrieving a caller profile according to the caller VID. Next, block 156 depicts playing a menu of options to a caller. As previously described, the menu of queue options and other output to a caller may be specified according to a caller profile detected according to caller ID.

Next, block 158 illustrates a determination as to whether a caller has selected from the menu options. If a caller does not select from the menu options, then the call is placed in a default queue, as illustrated at block 162, and the process passes to block 164. If a caller does select from the menu options, then the process passes to block 160.

Block 160 depicts placing the call in one of the multiple queues depending on the menu selection. Next, block 164 illustrates specifying browsing options and offers for that queue for the caller according to the caller profile and current offers. Thereafter, block 166 depicts playing tailored browsing options to the caller. In addition other service options may be presented to the caller.

Block 168 depicts a determination as to whether the caller selects a browser option. The process may iterate at block 168 for a period of time if no browser option is selected. When a browser option is selected, then the process passes to block 170.

Block 170 illustrates transmitting a request to the designated server for the selected web page documents. Next, block 172 depicts a depicts a determination as to whether the selected documents are received in voice XML. If the selected documents are received in voice XML, then the voice XML documents are translated by the voice browser into audio output to the caller, as depicted at block 174, and the process passes to block 176. If the selected documents are not received in voice XML, then translation and transcoding of the documents into the voice XML format is performed, as illustrated at block 171, before the process passes to block 174.

Block 176 depicts updating the caller profile with the incentive offer earned by the caller for browsing specified web pages, and the process ends. In particular, the incentive stored at a caller profile may be redeemable during the current call or in the future through one of multiple interfaces.

In response to the call being next in line in a queue, the caller is notified of the next in line status, as illustrated at block 178. Next, block 180 depicts a determination as to whether the caller indicates a readiness to transfer to a representative. According to the advantage of the present invention, the caller may access needed information by voice browsing and no longer needs the assistance of a representative. If the caller does not indicate a readiness to transfer to a representative, then the call is removed from the queue, as illustrated at block 184, and the process ends. If a caller does indicate a readiness to transfer to a representative, then the process passes to block 182. Block 182 depicts transferring the call to the PBX system to be transferred to a representative according to the menu option (or queue subject) selected by a caller, and the process ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for promoting voice browsing, comprising:
    selecting at least one web page from among a plurality of accessible web pages for voice browsing by a particular caller waiting in a hold queue; and
    offering said particular caller an incentive to voice browse said at least one web page, wherein said incentive comprises a value redeemable in a transaction independent of said particular caller waiting in said hold queue.

2. The method for promoting voice browsing according to claim 1, further comprising:
responsive to a selection by said caller to voice browse said at least one web page, translating a web script for at least one web page into audio output to said particular caller.

3. The method for promoting voice browsing according to claim 1, further comprising:
responsive to voice browsing of said at least one web page, providing said incentive for said particular caller for redemption during said call.

4. The method for promoting voice browsing according to claim 1, further comprising:
responsive to voice browsing of said at least one web page, providing said incentive for said particular caller for storage in a caller profile associated with said particular caller, wherein said particular caller is enabled to redeem said incentive from said caller profile in a future transaction.

5. The method for promoting voice browsing according to claim 1, wherein said incentive comprises at least one from among an on hold advancement token, membership points, an electronic discount, and a cash value.

6. The method for promoting voice browsing according to claim 1, further comprising:
receiving a call from said particular caller at said hold queue;
authenticating an identity of said caller;
positioning said call in said hold queue;
retrieving a caller profile according to said authenticated identity of said caller; and
selecting said at least one web page from among said plurality of accessible web pages for browsing by said particular caller according to said caller profile.

7. The method for promoting voice browsing according to claim 6, wherein selecting said at least one web page further comprises:
selecting said at least one web page from among said plurality of accessible web pages in view of a selection of said plurality of accessible web pages already accessed by said caller via a web browser.

8. The method for promoting voice browsing according to claim 1, wherein selecting at least one web page further comprises:
specifying said at least one web page according to at least one from among a caller profile retrieved for said particular caller, a subject of said call specified by said particular caller, and general web page selections.

9. The method for promoting voice browsing according to claim 1, wherein said at least one web page is provided to aid said particular caller in solving a question that is the basis of said call.

10. The method for promoting voice browsing according to claim 1, wherein said at least one web page is provided to advertise a product to said particular caller.

11. The method for promoting voice browsing according to claim 1, wherein said at least one page provided to advertise a product is received from a third party vendor.

12. A system for promoting voice browsing, comprising:
a call center comprising a hold queue;
means for selecting at least one web page from among a plurality of accessible web pages for voice browsing by a particular caller waiting in said hold queue; and
means for offering said particular caller an incentive to voice browse said at least one web page, wherein said incentive comprises a value redeemable in a transaction independent of said particular caller waiting in said hold queue.

13. The system for promoting voice browsing according to claim 12, further comprising:
means responsive to a selection by said caller to voice browse said at least one web page, for translating a web script for at least one web page into audio output to said particular caller.

14. The system for promoting voice browsing according to claim 12, further comprising:
means responsive to voice browsing of said at least one web page, for providing said incentive for said particular caller for redemption during said call.

15. The system for promoting voice browsing according to claim 12, further comprising:
means responsive to voice browsing of said at least one web page, for providing said incentive for said particular caller for storage in a caller profile associated with said particular caller, wherein said particular caller is enabled to redeem said incentive from said caller profile in a future transaction.

16. The system for promoting voice browsing according to claim 12, wherein said incentive comprises at least one from among an on hold advancement token, membership points, an electronic discount, and a cash value.

17. The system for promoting voice browsing according to claim 12, further comprising:
means for receiving a call from said particular caller at said call center;
means for authenticating an identity of said caller;
means for positioning said call in said hold queue;
means for retrieving a caller profile according to said authenticated identity of said caller; and
means for selecting said at least one web page from among said plurality of accessible web pages for browsing by said particular caller according to said caller profile.

18. The system for promoting voice browsing according to claim 17, wherein said means for selecting said at least one web page further comprises:
means for selecting said at least one web page from among said plurality of accessible web pages in view of a selection of said plurality of accessible web pages already accessed by said caller via a web browser.

19. The system for promoting voice browsing according to claim 12, wherein selecting at least one web page further comprises:
means for specifying said at least one web page according to at least one from among a caller profile retrieved for said particular caller, a subject of said call specified by said particular caller, and general web page selections.

20. The system for promoting voice browsing according to claim 12, wherein said at least one web page is provided to aid said particular caller in solving a question that is the basis of said call.

21. The system for promoting voice browsing according to claim 12, wherein said at least one web page is provided to advertise a product to said particular caller.

22. The system for promoting voice browsing according to claim 12, wherein said at least one page provided to advertise a product is received from a third party vendor.

23. A computer program product for promoting voice browsing, comprising:
a recording medium;
means, recorded on said recording medium, for directing selection of at least one web page from among a plurality of accessible web pages for voice browsing by a particular caller waiting in said hold queue; and means, recorded on said recording medium, for enabling an offering to said particular caller of an incentive for voice browsing said at least one web page, wherein said incentive comprises a value redeemable in a transaction independent of said particular caller waiting in said hold queue.

24. The computer program product for promoting voice browsing according to claim 23, further comprising:

means, recorded on said recording medium, for translating a web script for at least one web page selected by said particular caller into audio output directed to said particular caller.

25. The computer program product for promoting voice browsing according to claim 23, further comprising:

responsive to a selection by said caller to voice browse said at least one web page, for providing said incentive for said particular caller for redemption during said call responsive to said particular caller voice browsing said at least one web page.

26. The computer program product for promoting voice browsing according to claim 23, further comprising:

responsive to a selection by said caller to voice browse said at least one web page, for providing said incentive for said particular caller for storage in a caller profile associated with said particular caller, wherein said particular caller is enabled to redeem said incentive from said caller profile in a future transaction.

27. The computer program product for promoting voice browsing according to claim 23, further comprising:

means, recorded on said recording medium, for enabling receipt of a call from said particular caller;

means, recorded on said recording medium, for authenticating an identity of said caller;

means, recorded on said recording medium, for controlling positioning of said call in said hold queue;

means, recorded on said recording medium, for initiating retrieval of a caller profile according to said authenticated identity of said caller; and means, recorded on said recording medium, for selecting said at least one web page from among said plurality of accessible web pages for browsing by said particular caller according to said caller profile.

28. The computer program product for promoting voice browsing according to claim 27, further comprising:

means, recorded on said recording medium, for selecting said at least one web page from among said plurality of accessible web pages in view of a selection of said plurality of accessible web pages already accessed by said caller via a web browser.

29. The computer program product for promoting voice browsing according to claim 27, wherein selecting at least one web page further comprises:

means, recorded on said recording medium, for specifying said at least one web page according to at least one from among a caller profile retrieved for said particular caller, a subject of said call specified by said particular caller, and general web page selections.

* * * * *